US010799797B2

(12) United States Patent
Burkatovskiy (10) Patent No.: US 10,799,797 B2
(45) Date of Patent: Oct. 13, 2020

(54) EXPANDING PROGRESSION IN A VIDEO GAME

(71) Applicant: Wargaming.net Limited, Nicosia (CY)

(72) Inventor: Sergey Burkatovskiy, Minsk (BY)

(73) Assignee: Wargaming.net Limited, Nicosia (CY)

( * ) Notice: Subject to any disclaimer, the term of this patent is extended or adjusted under 35 U.S.C. 154(b) by 0 days.

(21) Appl. No.: 16/454,237

(22) Filed: Jun. 27, 2019

(65) Prior Publication Data

US 2020/0038758 A1 Feb. 6, 2020

Related U.S. Application Data

(60) Provisional application No. 62/713,642, filed on Aug. 2, 2018.

(51) Int. Cl.
*A63F 13/67* (2014.01)
*A63F 13/79* (2014.01)

(52) U.S. Cl.
CPC .............. *A63F 13/67* (2014.09); *A63F 13/79* (2014.09)

(58) Field of Classification Search
USPC ......................................................... 463/31
See application file for complete search history.

(56) References Cited

U.S. PATENT DOCUMENTS

| 6,940,513 | B2 * | 9/2005 | Morgan, III | .......... G06T 15/005 345/506 |
| 2015/0248808 | A1 * | 9/2015 | Crawford, III | ..... G07F 17/3265 463/20 |
| 2016/0012675 | A1 * | 1/2016 | Arnone | ............... G07F 17/3258 463/10 |
| 2019/0005772 | A1 * | 1/2019 | Cire | .................... G07F 17/3258 |

* cited by examiner

*Primary Examiner* — Pierre E Elisca
(74) *Attorney, Agent, or Firm* — Banner & Witcoff, Ltd.

(57) ABSTRACT

Methods, systems, and apparatuses are described herein for providing an interactive application, such as a video game, with a hierarchy of avatar categories, each having a maximum and minimum progression value. Each avatar category may be associated with one or more avatars, items, and/or other portions of the interactive application. A beginner avatar category may be associated with a minimum progression value greater than an absolute minimum progression value and a maximum progression value lesser than an absolute maximum progression value. A second avatar category may be associated with a minimum and maximum progression value that are, respectively, lower and greater than that of the beginner avatar category. The interactive application may allow a user to select from the beginner avatar category and the second avatar category. An avatar category may be associated with game rewards.

20 Claims, 4 Drawing Sheets

EXPANDING PROGRESSION IN A VIDEO GAME

CROSS REFERENCE TO RELATED APPLICATIONS

This application is a non-provisional of, and claims priority to, U.S. Provisional Application No. 62/713,642, filed Aug. 2, 2018, which prior application is incorporated by reference herein in its entirety for all purposes.

FIELD

Aspects described herein generally relate to computers, computer software, and interactive media entertainment applications providing a plurality of avatar categories with different progression ranges within the application. More specifically, the interactive applications described herein provide a beginning avatar category with a first progression range and a second avatar category with a second progression range.

BACKGROUND

Interactive applications, such as video games, may reward users for their performance by, for example, providing such users access to progressively better game items, levels, story, or other such rewards. For example, in a Massively Multiplayer Online Role Playing Game ("MMORPG"), a user may be rewarded for their effort by improving properties of one or more of the user's in-game characters, by providing the user with new and/or better items, and/or progressing an in-game story. As another example, in popular shooter games, players are often rewarded for in-game victories by being given access to progressively better guns, vehicles, characters, and levels.

Because interactive applications may require significant effort from users before providing those users with such improvements, users may become discouraged and stop playing an interactive application before they enjoy the benefit of the improvements. In some popular multiplayer titles, players may be forced to invest tens to hundreds of hours before certain gameplay features (e.g., interesting in-game items, advanced levels, story elements) are available. For example, a MMORPG may have content which may only be accessed by users that have invested a substantial amount of time in the MMORPG (e.g., users with high level characters), but players may become discouraged and quit the MMORPG before such content is available because such content make take hours of effort to access. For multiplayer video games, this result can be particularly undesirable, as this creates player churn which ultimately means a smaller, less engaged player base. There is thus an ongoing need to optimize interactive software in order to provide a better and more satisfying experience to users.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to establishing, in an interactive application, avatar categories with minimum and maximum progression values.

An interactive application executing on a computing device may be configured with avatar categories corresponding to one or more avatars, wherein each avatar category has a minimum and maximum progression value. Avatars, items, and/or other portions of an interactive application within an avatar category may have one or more progression values that may be between the minimum and maximum progression values of a corresponding avatar category. A progression value may comprise a game avatar level, a property of one or more game avatars (e.g., strength, agility, health points), and/or another value of the interactive application. A progression value may additionally and/or alternatively be associated with the difficulty of the interactive application such that, for example, a higher strength avatar may render the interactive application easier than a lower strength avatar. A beginning avatar category may be associated with a minimum progression value larger than an absolute minimum progression value and a maximum progression value lower than an absolute maximum progression value. A second avatar category may be associated with a lower minimum progression value as compared to the beginning avatar category, but may have a higher maximum progression value as compared to the beginning avatar category. The second avatar category may be associated with more difficult, longer, and/or otherwise less desirable gameplay. Additionally and/or alternatively, avatars in the second avatar category may be more desirable because of additional features associated with the second avatar category, such as cosmetic enhancements. The second avatar category may thereby require additional time expenditure on the part of the player, and may be configured to more initially difficult than the beginning avatar category, but the second avatar category may offer a higher maximum progression value and/or other benefits to incentivize use of the second avatar category. Avatar categories may additionally and/or alternatively be associated with varying amounts of game rewards, such as a quantity of game rewards and/or a game rewards multiplier. Additionally and/or alternatively, users of different avatar categories may play against each other, and the broadening progression scheme described herein helps to provide a "level playing field" among players of different skill levels.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms is meant to include both direct and indirect connecting and/or coupling.

Figure 1:
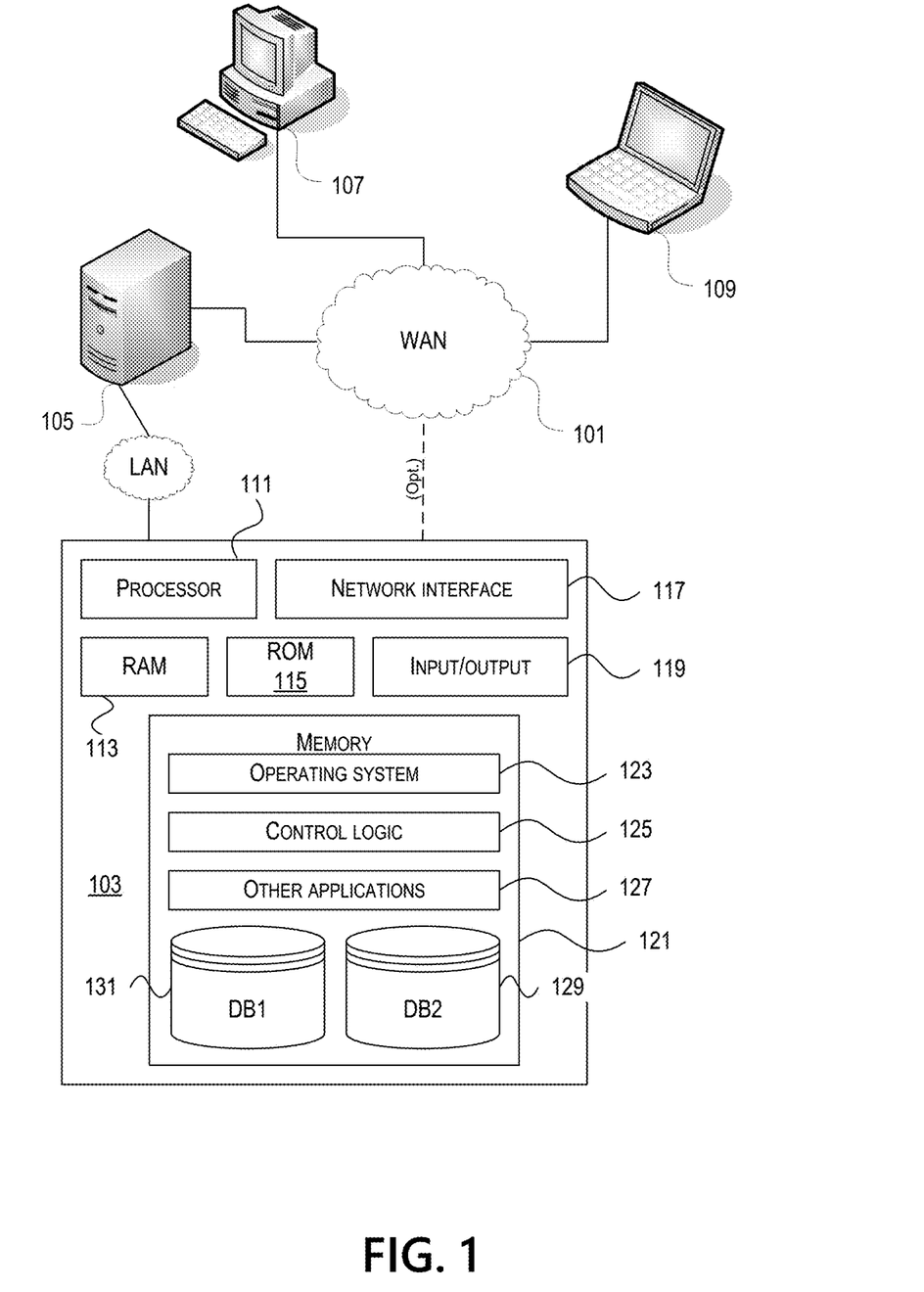
FIG. 1 illustrates network architecture that may be used to implement one or more illustrative aspects described herein.

FIG. 1 illustrates one example of a network architecture and data processing device that may be used to implement one or more illustrative aspects described herein. Various network nodes 103, 105, 107, and 109 may be interconnected via a wide area network ("WAN") 101, such as the Internet. Other networks may also or alternatively be used, including private intranets, corporate networks, LANs, wireless networks, personal networks ("PAN"), and the like. A network 101 is for illustration purposes and may be replaced with fewer or additional computer networks. A local area network ("LAN") may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include a data server 103, a web server 105, and a client computers 107, 109. The data server 103 provides overall access, control and administration of databases and control software for performing one or more illustrative aspects described herein. The data server 103 may be connected to the web server 105 through which users interact with and obtain data as requested. Alternatively, the data server 103 may act as a web server itself and be directly connected to the Internet. The data server 103 may be connected to the web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by the web server 105. Client computers 107, 109 may be used in concert with the data server 103 to access data stored therein, or may be used for other purposes. For example, from a client device 107, a user may access the web server 105 using an Internet browser, as is known in the art, or by executing a software application that communicates with the web server 105 and/or the data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by the web server 105 and the data server 103 may be combined on a single server.

Each component 103, 105, 107, 109 may be any type of known computer, server, or data processing device. The data server 103, e.g., may include one or more processors 111 controlling overall operation of the rate server 103. The data server 103 may further include Random Access Memory ("RAM") 113, Read Only Memory ("ROM") 115, a network interface 117, input/output interfaces 119 (e.g., keyboard, mouse, display, printer, etc.), and memory 121. I/O 119 may include a variety of interface units and drives for reading, writing, displaying, and/or printing data or files. The memory 121 may further store operating system software 123 for controlling overall operation of the data processing device 103, control logic 125 for instructing the data server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

The memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service ("QoS"), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Hypertext Markup Language ("HTML") or Extensible Markup Language ("XML"). The computer executable instructions may be stored on a computer readable medium such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays ("FPGA"), and the like. Particular data structures may be used to more effectively implement one or more aspects, and such data structures are contemplated within the scope of computer executable instructions and computer-usable data described herein.

Figure 2:
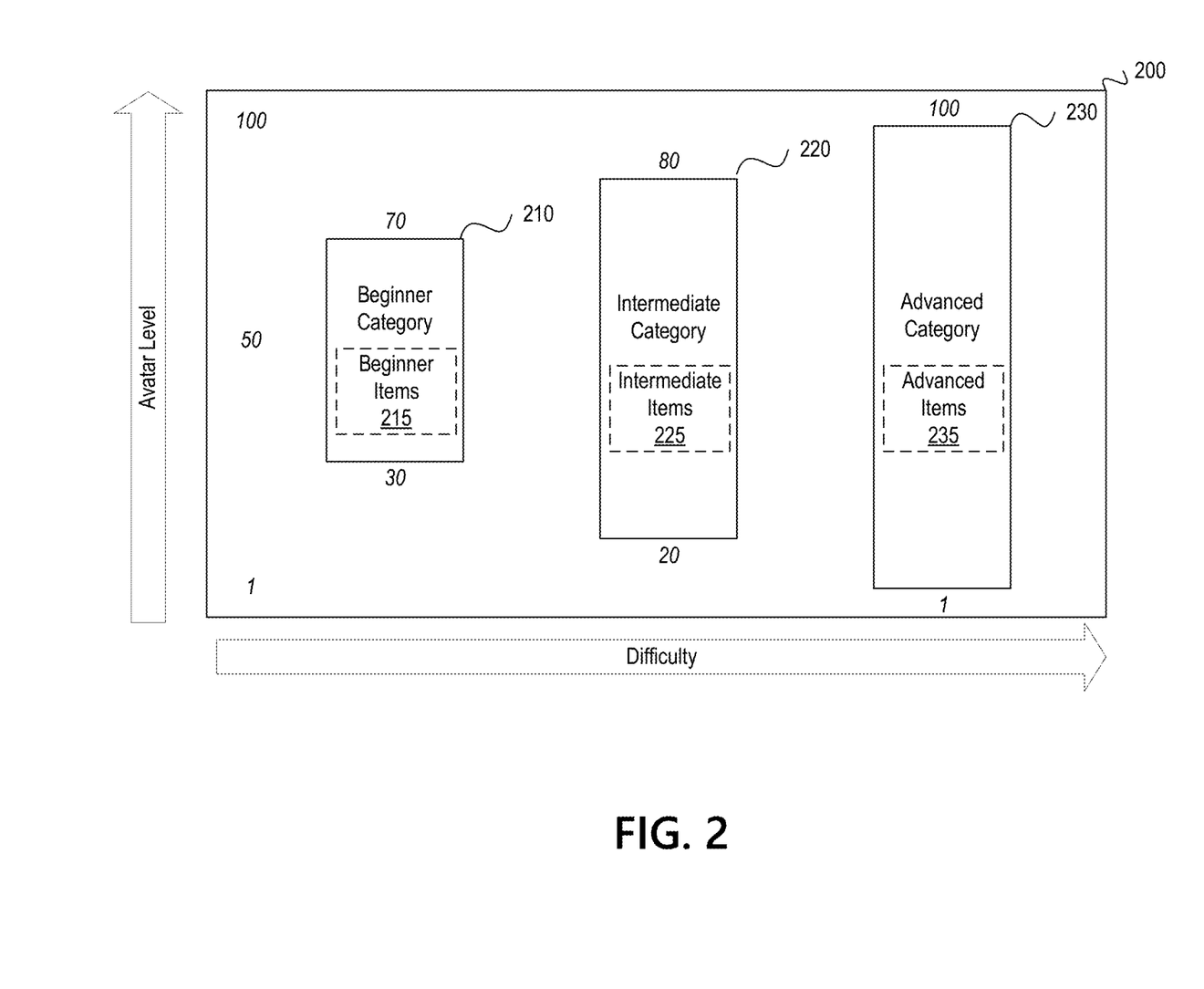
FIG. 2 illustrates a hierarchy of avatar categories, each with corresponding items.

FIG. 2 shows one example of a chart depicting a hierarchy of avatar categories 200. The hierarchy of avatar categories 200 shown in FIG. 2 may be arranged such that difficulty is on the horizontal axis and that the levels an avatar can achieve are expressed on the vertical axis. FIG. 2 shows three avatar categories: a beginner category 210 with beginner items 215, an intermediate category 220 with intermediate items 225, and an advanced category 230 with advanced items 235. Though FIG. 2 shows three avatar categories, any number of avatar categories may be used. Moreover, though this disclosure uses the term avatar categories for simplicity, categories may relate to any in-game items, vehicles, characters and/or other playable elements and/or portions of the interactive application.

Avatar categories, such as the beginner category 210, the intermediate category 220, and the advanced category 230, may comprise and/or be associated with one or more avatars, items, and/or other elements of an interactive application. For example, the beginner category 210 may be associated with the beginner items 215, the intermediate category 220 may be associated with the intermediate items 225, and the advanced category 230 may be associated with the advanced items 235. More and/or fewer avatar categories may be implemented. An increased difficulty and/or undesirability of an avatar category may be associated with more desirable items, characters, and/or other elements of the interactive application. For example, the beginner items 215 may comprise useful but uninteresting weapons (e.g, a simple dagger and/or a plain tank), whereas the advanced items 235 may comprise similarly useful but more attractive weapons (e.g., an ornate sword and/or a historically relevant tank). The portions of an interactive application that an avatar category is associated with may depend on the nature of the interactive application. For example, avatar categories in a driving game may comprise a plurality of vehicles, avatar categories in a role-playing game may comprise characters and/or usable items, and avatar categories in a shooting game may comprise playable operators and/or guns. Avatar categories may share the same or similar avatars, items, and/or other portions of the interactive application. For example, the same item may be shared between the beginner category 210 and the intermediate category 220, though that item may be subject to different maximum and minimum progression values based on the avatar category the user selects.

Each avatar category may be configured with a maximum and minimum progression value. An avatar, item, and/or other portion of the avatar category (e.g., a character, tank, and/or car in the avatar category) may have one or more progression values and/or ranges within the maximum and minimum of the avatar category. A progression value may comprise a level, a property of one or more game avatars (e.g., strength, agility, health points, mana points, speed, rounds per minute), and/or another value of the interactive application. For example, an avatar category in a racing game may define a range of top speeds of a vehicle (e.g., a thirty miles per hour minimum top speed and seventy miles per hour maximum top speed), such that a car in the avatar category may progress from and/or have a minimum top speed of thirty miles per hour and progress towards and/or a maximum top speed of seventy miles per hour. As another example, a racing game may define a top speed (e.g., 100 miles per hour), cars in a beginner avatar category in the racing game may have a top speed range (e.g., 30-70% of the top speed), and cars in an advanced avatar category in the racing game may have a broader top speed range (e.g., 1-100% of the maximum speed). A user may improve the performance of an avatar within the avatar category, subject to the minimum progression value and the maximum progression value of the avatar category. For example, in the racing game mentioned above, a user may install better tires on the vehicle to allow the car to reach a higher top speed. As another example, a user in a role playing game may increase a level of an avatar, subject to the maximum and minimum progression values and/or ranges of a corresponding avatar category.

The beginner category 210 may be a category which is initially provided to a user of an interactive application. The beginner category 210 may have a minimum progression value that is greater than an absolute minimum progression value. For example, the minimum of the beginner category 210 is level 30, whereas the absolute minimum may be level one. The beginner category 210 may have a maximum progression value that is lower than an absolute maximum progression value. For example, the maximum of the beginner category 210 is level 70, whereas the absolute maximum progression value may be 100. As depicted by FIG. 2, rather than starting at level one, the user is allowed to start at level 30, which may improve the user's experience. FIG. 2 also illustrates that such early access has a trade-off: while the user may be allowed to start at level 30, the user may reach no greater than level 70.

The intermediate category 220 may, as compared to the beginner category 210, have a lower minimum progression value but a greater maximum progression value. For example, the minimum progression value of the intermediate category 220 may be level 20, but the maximum progression value of the intermediate category 220 may be level 80. The intermediate category 220 may be more difficult and/or otherwise more undesirable than the beginner category 210. For example, the intermediate category 220 may be associated with a form of gameplay that is, regardless of progression value, more difficult than a second form of gameplay associated with the beginner category 210. As such, the intermediate category 220 may be associated with a more difficult and/or undesirable form of the interactive application and/or start at an even lower progression value as compared to the beginner category 210, but the category may allow the user to access a higher progression value as compared to the beginner category 210.

The advanced category 230 may, as compared to the beginner category 210 and the intermediate category 220, have a lower minimum progression value but a greater maximum progression value. The maximum progression value of the advanced category 230 may be an absolute maximum progression value, and the minimum progression value of the advanced category 230 may be the absolute minimum progression value. For example, the minimum progression value of the advanced category 230 may be level one, but the maximum progression value of the advanced category 230 may be level one hundred. The advanced category 230 may be associated with a form of gameplay that is more difficult and/or more undesirable than either or both the intermediate category 220 and/or the beginner category 210. In this manner, the advanced category may be associated with greater difficulty and/or more undesirable features of the interactive application, and may require that a user start at a lower progression value as compared to either or both the intermediate category 220 and/or the beginner category 210, but may enable the user to access a progression value greater than either or both the intermediate category 220 and/or the beginner category 210.

Though only three categories are shown in FIG. 2, any number of categories may be implemented. For example, the intermediate category 220 may be removed, and/or a second intermediate category may be added. Additionally and/or alternatively, the three categories depicted in FIG. 2 may be defined by a mathematical progression, such that the maximum and minimum progression values depicted may be derived by a mathematical formula. Based on such a mathematical formula, a user of the interactive application may be able to increase and/or decrease the level of difficulty to access a broader range of progression values. As an example, for a difficulty d ranging from 0 to 100, a maximum progression value may be defined by the equation $f(d)=0.1d+5$, and the minimum progression value may be defined by the equation $g(d)=-0.1d+3$, such that a difficulty setting of d=10 would result in a maximum progression value of 6, and a minimum progression value of 2.

Each of the avatar categories, such as the beginner category 210, the intermediate category 220, and the advanced category 230, may be restricted to users of the interactive application. A user may be given the option to access a category based on an amount of time meeting a threshold, the user's performance in a different category, and/or another similar achievement. A category, such as the beginner category 210, may be restricted to new users of the interactive application (e.g., the beginner category 210 being available only to users of the interactive application whose time playing the interactive application does not meet a predetermined maximum). One or more first avatar categories may be limited such that a user must reach a certain progression value in one or more second avatar categories (e.g., having at least one avatar in the second avatar category reach a certain progression value) before being given access to the one or more first avatar categories. One or more portions of an avatar category (e.g., certain tanks, cars, characters, etc.) may be available based on the user's performance in the avatar category. For example, an avatar category may be associated with three tanks, and the user must use the first tank at least five times before being given access to the second tank.

Each of the avatar categories may be associated with different functionality of the interactive application. For example, the intermediate category 220 may have more customization options (e.g., of an avatar, an item, and/or another portion of the interactive application) as compared to the beginner category 210. For example, avatars associated with the advanced category 230 may be able to wear more aesthetically appealing clothing than avatars associated with the beginner category 210. Some avatar categories may allow users to purchase modifications to the interactive application relating to progression values (e.g., progression value multipliers). Some avatar categories may be limited in terms of gameplay such that, for example, users of an avatar in the beginner category 210 may only play against other users using avatars from the beginner category 210. Some game modes of the interactive application may restrict use of only avatars and/or items from certain avatar categories. Some avatar categories may allow users to use avatars, items, and/or other portions of the interactive application from other avatar categories. For example, a user may earn the ability to use an avatar associated with the beginner category 210 in the advanced category 230.

As shown by FIG. 2, the hierarchy of avatar categories 200 may allow early users of the interactive application to access a limited range of better progression values while providing the option to and/or incentives to access a broader range of potentially even better progression values. For example, an interactive application may give early users the ability to use a first tank associated with a beginning avatar category, and the first tank may start with a beginning attack power of thirty points. Through gameplay success, the user may be capable of improving the first tank's attack power from thirty points to a maximum attack power of fifty points. After the user has developed proficiency with the first tank (e.g., once the first tank's attack power reaches forty points), the interactive application may allow the user to use a second tank associated with a second avatar category with a beginning attack power of ten points and a maximum attack power of seventy points. The second tank in this example may be more difficult to use but more aesthetically pleasing. As such, the user may struggle with an underpowered tank but, through additional effort, may reach an attack power that could not be achieved via the beginning avatar category.

Figure 3:
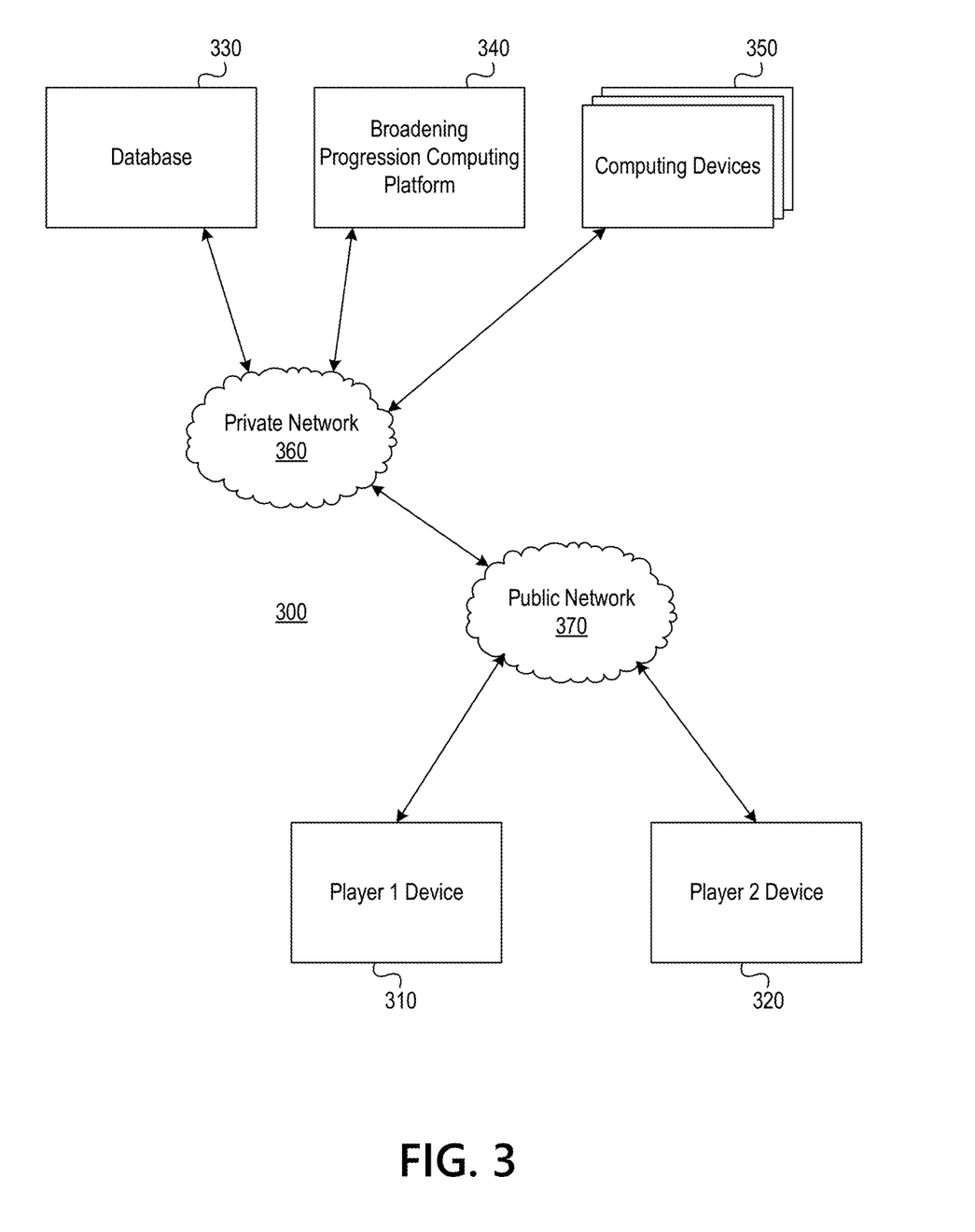
FIG. 3 shows a simplified network including a broadening progression computing platform.

FIG. 3 depicts a simplified network upon which the features described herein may be implemented with respect to the hierarchy of avatar categories 200.

A broadening progression computing platform 340 may be connected via a private network 360 to a database 330, computing devices 350, and ultimately, through a public network 370, to a player device and/or player devices such as a player 1 device 310 and a player 2 device 320.

The broadening progression computing platform 340 may be a computing device which administrates a broadening progression system for an interactive application, such as the hierarchy of avatar categories 200. The broadening progression computing platform 340 may be a part of a video game such that, for example, the broadening progression computing platform 340 is a module associated with and/or part of a video game executable. The broadening progression computing platform 340 may additionally or alternatively interface with the computing devices 350 to, for example, provide server functionality for a video game. For example, the broadening progression computing platform 340 may be a module of an authentication server for a multiplayer online video game, and the computing devices 350 may be devices handling other portions of the multiplayer online video game (e.g., keeping score, administrating game rules).

User devices, such as the player 1 device 310 and the player 2 device 320, may connect, via public network 370 and/or private network 360, to the broadening progression computing platform 340. The user devices may be personal computers, video game consoles, and/or other similar client computers. Connection by the user devices to the broadening progression computing platform 340 may comprise authentication using authentication credentials, which may be validated against credentials stored by database 330. For example, the player 1 device 310 may send authentication credentials to the broadening progression computing platform 340 to access an account in a video game and, thereby, information associated with progression values of avatars, items, and/or other portions of the interactive application associated with the account. Those avatars, items, and/or other portions of the interactive application may be used to, for instance, determine whether a user is allowed to access an avatar category in the hierarchy of avatar categories 200.

The database 330 may store information about the hierarchy of avatar categories 200 and/or avatars and/or items and/or other portions of the interactive application. For example, the database 330 may store an indication that a certain avatar corresponds to one or more avatar categories in the hierarchy of avatar categories 200. The user devices may access this information via the broadening progression computing platform 340 and/or directly over the private network 360 and/or the public network 370. For example, game executing on the player 1 device 310 may download, from the database 330, the hierarchy of avatar categories 200 to determine which avatars are available to a user.

Figure 4:
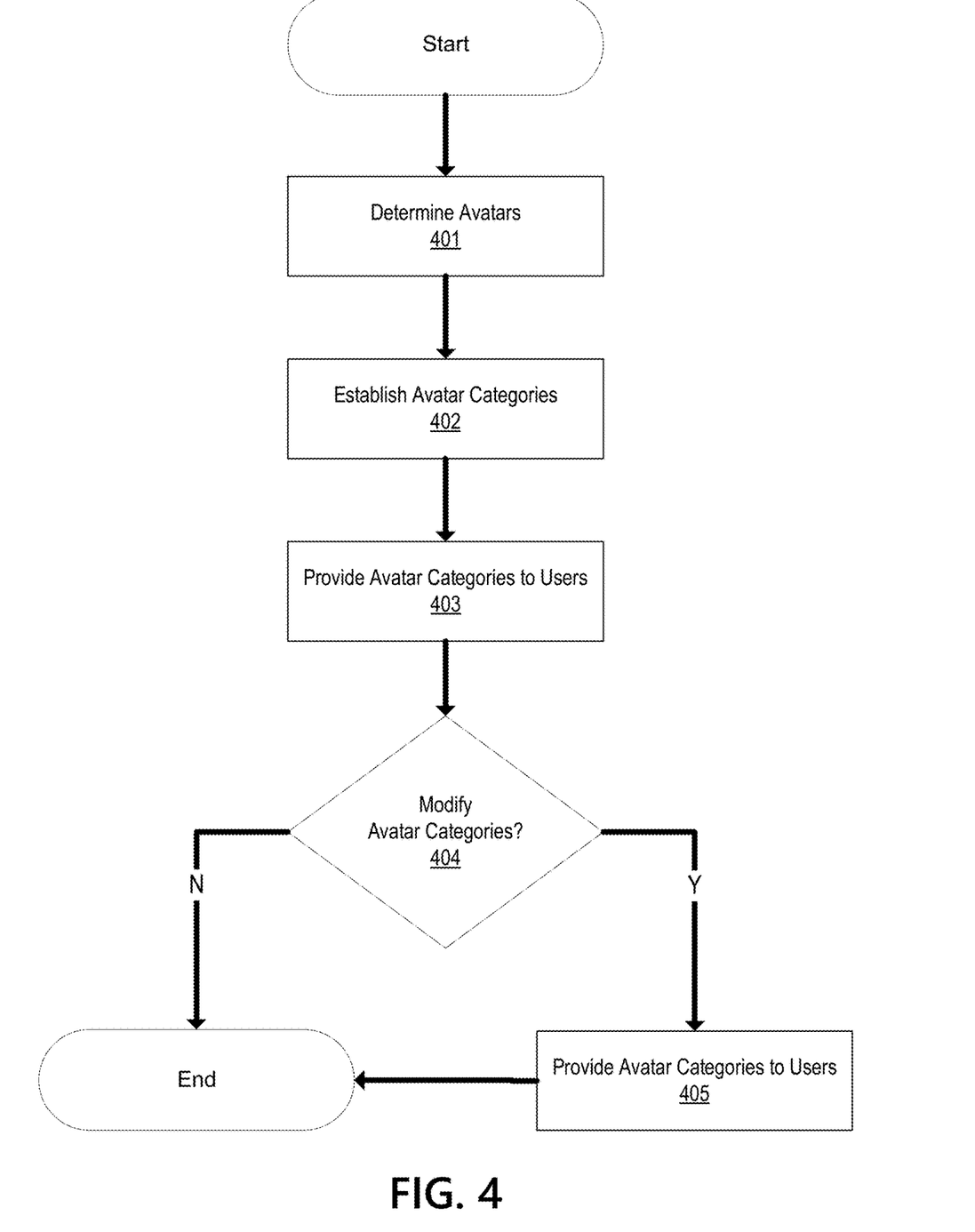
FIG. 4 shows a flow chart comprising steps in accordance with features described herein.

FIG. 4 shows a flow chart depicting steps which may be taken in accordance with features described herein.

In step 401, the broadening progression computing platform may determine avatars, items, and/or other portions of the interactive application. Avatars need not be specific game characters but may be character classes, teams, and/or other related associations of game characters. Items may comprise any appropriate aspect of a game, and may vary depending on the genre and/or nature of the game: for example, in a shooter game, the items may comprise guns, whereas in an adventure game, the items may comprise a rubber chicken with a pulley in the middle. As noted above, the particular portions of the interactive application determined may depend on the genre and/or style of the interactive application. For example, one shooter game may determine guns, tanks, and/or characters, whereas a role-playing game may determine in-game pets, magic spells, and/or character classes.

In step 402, the broadening progression computing platform may establish a hierarchy of avatar categories (e.g., the hierarchy of avatar categories 200). Each avatar category may comprise one or more of the determined avatars, items, and/or other portions of the interactive application. The hierarchy need not be configured such that higher avatar categories are easier and/or more desirable, though higher avatar categories may have relatively larger maximum progression values. For example, a higher avatar category may be harder and/or have less desirable avatars, but may be associated with other benefits (e.g., better game rewards, prestige, access to different forms of competition, a better game ending). A higher avatar category may, for example, be harder in part because of a lower minimum progression value. Each avatar category may be configured with a minimum progression value and a maximum progression value. The minimum and maximum progression values may be relative to other avatar categories (e.g., an advanced avatar category having twice the breadth of an intermediate avatar category).

The hierarchy of avatar categories may be configured such that each avatar category corresponds to game rewards. For example, each category in the hierarchy of avatar categories may correspond to a predetermined number of game rewards, a game reward multiplier, a type of game rewards, and/or other similar game rewards configurations. Adjusted game rewards may be determined by multiplying a base level of game rewards by a game reward multiplier associated with an avatar category used by a player. The hierarchy of avatar categories may be configured such that certain categories may correspond to fewer and/or worse game rewards, whereas other categories may correspond to more and/or better game rewards. In this manner, the hierarchy of avatar categories may be configured to incentivize users to play with more difficult and/or less desirable avatars, items, and/or other portions of an interactive application.

The hierarchy of avatar categories may be stored and/or maintained by the broadening progression computing platform. For example, the hierarchy of avatar categories may be stored in a database using Structured Query Language ("SQL") and may be modified by game administrators as desired. The hierarchy of avatar categories may thereby be flexible and easily changed without modification to, for example, game executable files.

In step 403, one or more users may connect to the interactive application, and the broadening progression computing platform may establish the hierarchy of avatar categories. For example, a user may connect to a game server, and the game server may use the broadening progression computing platform to provide the user access to one or more avatar categories based on, for example, a progression value associated with the user's account. If the user is new, the broadening progression computing platform may provide the user with access to a beginning avatar category. The user may have the option to select, from a plurality of avatar categories, one or more avatar categories. For example, the interactive application may allow a user to pilot two airplanes at once, and the user may select two different avatar categories from a plurality of avatar categories, each intended for a different airplane.

In step 404, the broadening progression computing platform and/or a game administrator may determine whether to modify the hierarchy of avatar categories. The hierarchy of avatar categories may be continually updated to, for example, balance incentives for users to engage with an interactive application versus difficulty. For example, excessively easy categories may result in players quickly completing and/or becoming tired of an interactive application, whereas excessively difficult categories may result in players easily giving up. Moreover, the difference between categories may be modified to, for example, ensure that a transition between an easy category and a hard category is not so extreme as to discourage players. The broadening progression computing platform may be configured to determine whether to modify the hierarchy of avatar categories based on analysis of gameplay data. For example, the broadening progression computing platform may receive and analyze and/or be configured log and analyze a win and/or loss rate with a particular avatar and/or item, a frequency with which a particular avatar category and/or item is used, and/or similar information about gameplay. This step needs not be performed by the broadening computing platform, but may additionally or alternatively be performed by a game administrator.

If the broadening progression computing platform and/or the game administrator determine to not modify the hierarchy of avatar categories and/or the hierarchy of game items, the flowchart may end.

If the broadening progression computing platform and/or the game administrator determine to modify the hierarchy of avatar categories, in step 405, the broadening progression computing platform may modify the hierarchy of avatar categories. Modification may include changing entries in a database comprising the hierarchy of avatar categories.

Modification of the hierarchy of avatar categories may comprise modifying the placement of a particular avatar category in the hierarchy, modifying the maximum and/or minimum progression value, modifying the game rewards (e.g., the game reward multiplier) associated with a particular avatar category, modifying which avatars, items, and/or other portions of the interactive application are associated with a particular avatar category, and/or any other such modifications. For example, a game administrator may determine that a particular avatar category is rarely used by users because the balance of game rewards and added difficulty (via, for example, weaker avatars) is poor. As a result, the game administrator may modify the particular avatar category to provide more and/or better game rewards, correspond to better avatars, items, and/or other portions of the interactive application, or the like. Additionally or alternatively, the game administrator may weaken corresponding avatars, items, and/or other portions of the interactive application and/or associate the particular avatar category with fewer and/or worse game rewards. Additionally and/or alternatively, avatar categories may be added, removed, or the like. For example, based on determining that a switch between a first avatar category and a second avatar category results in a jarring increase in difficulty, a third avatar category between the first avatar category and the second avatar category may be added.

Modification of one or more avatars, items, and/or other portions of the interactive application and/or the hierarchy of avatar categories may comprise modifying a parameter of avatars, items, and/or other portions of the interactive application. For example, a game administrator may determine that a particular avatar available in an avatar category is disproportionately weak such that users rarely use the avatar, and/or that the avatar is disproportionately strong such that users overwhelmingly choose the avatar when using the corresponding avatar category. The game administrator may modify parameters of the avatar, move the avatar to a different avatar category, or even delete the avatar to further game balance.

Modification may comprise enforcing the modification in the game. The broadening progression computing platform may be configured to ensure that all users comply with the modified version of the hierarchy of avatar categories. For example, if the game is a multiplayer shooting game, the broadening progression computing platform may ensure that future shooting game matches use the modified versions of the hierarchy of avatar categories.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method comprising:
   establishing, by an interactive application executing on a computing device, a hierarchy of avatar categories, wherein:
      a first avatar category of the hierarchy of avatar categories is associated with a first minimum progression value greater than an absolute minimum progression value, and wherein the first avatar category is associated with a first maximum progression value lesser than an absolute maximum progression value; and
      a second avatar category of the hierarchy of avatar categories that has a broader range of progression values than the first avatar category;
   detecting a new user connecting to the interactive application;
   providing the new user access to one or more portions of the interactive application associated with the first avatar category; and
   providing the new user access to one or more second portions of the interactive application associated with the second avatar category.

2. The method of claim 1, wherein the one or more portions of the interactive application comprise one or more of: game avatars or game items.

3. The method of claim 1, further comprising:
   providing, to the new user, a first avatar corresponding to the first avatar category, wherein a first progression value associated with the first avatar is between the first minimum progression value and the first maximum progression value;
   providing, to the new user, a second avatar corresponding to the second avatar category, wherein the second avatar category is associated with a second minimum progression value lesser than the first minimum progression value, wherein the second avatar category is associated with a second maximum progression value greater than the first maximum progression value, and wherein a second progression value associated with the second avatar is between the second minimum progression value and the second maximum progression value; and
   providing, via the interactive application, gameplay to the new user, wherein providing gameplay to the new user comprises allowing the new user to use either the first avatar or the second avatar.

4. The method of claim 3, wherein the new user may improve the first progression value or the second progression value based on performance in the interactive application.

5. The method of claim 3, wherein providing gameplay to the new user via the interactive application comprises preventing the new user from using the second avatar based on the first progression value.

6. The method of claim 3, further comprising:
   determining a quantity of game rewards corresponding to performance of the new user during the gameplay;
   determining that the new user used the second avatar;
   determining adjusted game rewards by multiplying the quantity of game rewards by a second game reward multiplier associated with the second avatar category; and
   providing the adjusted game rewards to the new user.

7. The method of claim 1, wherein each avatar category of the hierarchy of avatar categories is associated with a respective quantity of game rewards or a game rewards multiplier.

8. The method of claim 1, further comprising:
   receiving gameplay data corresponding to the hierarchy of avatar categories; and
   modifying, based on the gameplay data, the hierarchy of avatar categories.

9. The method of claim 8, wherein modifying the hierarchy of avatar categories comprises associating an avatar with the first avatar category, wherein the avatar was previously associated with the second avatar category.

10. The method of claim 8, wherein modifying the hierarchy of avatar categories comprises associating an avatar with the second avatar category, wherein the avatar was previously associated with the first avatar category.

11. A computing device, comprising:
    one or more processors; and
    memory storing instructions that, when executed by the one or more processors, cause the computing device to:
       establish a hierarchy of avatar categories, wherein:
          a first avatar category of the hierarchy of avatar categories is associated with a first minimum progression value greater than an absolute minimum progression value, and wherein the first avatar category is associated with a first maximum progression value lesser than an absolute maximum progression value; and a second avatar category of the hierarchy of avatar categories has a broader range of progression values than the first avatar category;

detect a new user connecting to an interactive application;

provide the new user access to one or more portions of the interactive application associated with the first avatar category; and provide the new user access to one or more second portions of the interactive application associated with the second avatar category.

12. The computing device of claim 11, wherein the instructions, when executed by the one or more processors, cause the computing device to:

provide, to the new user, a first avatar corresponding to the first avatar category, wherein a first progression value associated with the first avatar is between the first minimum progression value and the first maximum progression value;

provide, to the new user, a second avatar corresponding to the second avatar category, wherein the second avatar category is associated with a second minimum progression value lesser than the first minimum progression value, wherein the second avatar category is associated with a second maximum progression value greater than the first maximum progression value, and wherein a second progression value associated with the second avatar is between the second minimum progression value and the second maximum progression value; and provide, via the interactive application, gameplay to the new user, wherein providing gameplay to the new user comprises allowing the new user to use either the first avatar or the second avatar.

13. The computing device of claim 12, wherein the new user may improve the first progression value or the second progression value based on performance in the interactive application.

14. The computing device of claim 12, wherein providing gameplay to the new user via the interactive application comprises preventing the new user from using the second avatar based on the first progression value.

15. The computing device of claim 12, wherein the instructions, when executed by the one or more processors, cause the computing device to:

determine a quantity of game rewards corresponding to performance of the new user during the gameplay;

determine that the new user used the second avatar during the gameplay;

determine adjusted game rewards by multiplying the quantity of game rewards by a game reward multiplier associated with the second avatar category; and provide the adjusted game rewards to the new user.

16. A system comprising:
a computing device; and
a player device;
wherein the computing device is configured to:
establish a hierarchy of avatar categories, wherein:
a first avatar category of the hierarchy of avatar categories is associated with a first minimum progression value greater than an absolute minimum progression value, and wherein the first avatar category is associated with a first maximum progression value lesser than an absolute maximum progression value; and a second avatar category of the hierarchy of avatar categories has a broader range of progression values than the first avatar category;

detect a new user connecting, via the player device, to an interactive application;

provide the new user access to one or more portions of the interactive application associated with the first avatar category; and provide the new user access to one or more second portions of the interactive application associated with the second avatar category; and wherein the player device is configured to:
receive the one or more portions of the interactive application associated with the first avatar category; and receive the one or more second portions of the interactive application associated with the second avatar category.

17. The system of claim 16, wherein the computing device is further configured to:

provide, to the new user, a first avatar corresponding to the first avatar category, wherein a first progression value associated with the first avatar is between the first minimum progression value and the first maximum progression value;

provide, to the new user, a second avatar corresponding to the second avatar category, wherein the second avatar category is associated with a second minimum progression value lesser than the first minimum progression value, wherein the second avatar category is associated with a second maximum progression value greater than the first maximum progression value, and wherein a second progression value associated with the second avatar is between the second minimum progression value and the second maximum progression value; and provide, via the interactive application, gameplay to the new user, wherein providing gameplay to the new user comprises allowing the new user to use either the first avatar or the second avatar.

18. The system of claim 17, wherein the new user may improve the first progression value or the second progression value based on performance in the interactive application.

19. The system of claim 17, wherein providing gameplay to the new user via the interactive application comprises preventing the new user from using the second avatar based on the first progression value.

20. The system of claim 17, wherein the computing device is further configured to:

determine a quantity of game rewards corresponding to performance of the new user during the gameplay;

determine that the new user used the second avatar during the gameplay;

determine adjusted game rewards by multiplying the quantity of game rewards by a game reward multiplier associated with the second avatar category; and provide the adjusted game rewards to the new user.

* * * * *